US012676721B2

(12) United States Patent
Dong

(10) Patent No.: US 12,676,721 B2
(45) Date of Patent: Jul. 7, 2026

(54) INFORMATION TRANSMISSION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 269 days.

(21) Appl. No.: 18/003,859

(22) PCT Filed: Jul. 7, 2020

(86) PCT No.: PCT/CN2020/100716
§ 371 (c)(1),
(2) Date: Dec. 29, 2022

(87) PCT Pub. No.: WO2022/006757
PCT Pub. Date: Jan. 13, 2022

(65) Prior Publication Data
US 2023/0269052 A1     Aug. 24, 2023

(51) Int. Cl.
*H04L 5/00* (2006.01)
*H04L 1/1607* (2023.01)

(52) U.S. Cl.
CPC .......... *H04L 5/0053* (2013.01); *H04L 1/1642* (2013.01)

(58) Field of Classification Search
None
See application file for complete search history.

(56) References Cited

U.S. PATENT DOCUMENTS

| | | | |
|---|---|---|---|
| 2015/0146699 A1 | 5/2015 | Wentink et al. | |
| 2017/0201343 A1* | 7/2017 | Merlin | H04L 1/1614 |
| 2017/0366362 A1* | 12/2017 | Sakai | H04L 5/0055 |
| 2019/0045537 A1* | 2/2019 | Seok | H04L 1/1854 |
| 2019/0268099 A1 | 8/2019 | Chu et al. | |
| 2019/0364555 A1 | 11/2019 | Huang et al. | |
| 2020/0037288 A1 | 1/2020 | Huang et al. | |
| 2021/0211235 A1* | 7/2021 | Chu | H04L 1/1614 |
| 2022/0014311 A1* | 1/2022 | Chitrakar | H04L 5/0055 |
| 2022/0231797 A1* | 7/2022 | Song | H04L 1/188 |
| 2022/0255681 A1* | 8/2022 | Huang | H04L 1/1685 |

FOREIGN PATENT DOCUMENTS

CN          105745857 A      7/2016

OTHER PUBLICATIONS

Notice of the first review opinion for Chinese Application No. 202080001470.3, dated May 12, 2023, 5 pages of original Chinese opinion and 9 pages of English translation.
International Search Report and Written Opinion of International Application No. PCT/CN2020/100716, mailed Apr. 6, 2021, 13 pages.
Extended European Search Report issued in Application No. 20944069.2 dated Mar. 12, 2024, 10 pages.

* cited by examiner

*Primary Examiner* — Saumit Shah
(74) *Attorney, Agent, or Firm* — Finnegan, Henderson, Farabow, Garrett & Dunner, L.L.P.

(57)          ABSTRACT
A method for information transmission, applied to a data frame receiver, includes: receiving a plurality of data frames transmitted continuously; and determining a block ACK message (BA) frame based on a number of the data frames transmitted continuously, wherein the BA frame at least comprises feedback information with a size greater than 256 bits.

20 Claims, 3 Drawing Sheets data frame receiver data frame sender

101: receiving a plurality of data frames transmitted continuously

102: determining a BA frame based on a number of the data frames transmitted continuously, in which the BA frame at least includes feedback information with the size which is greater than 256 bits

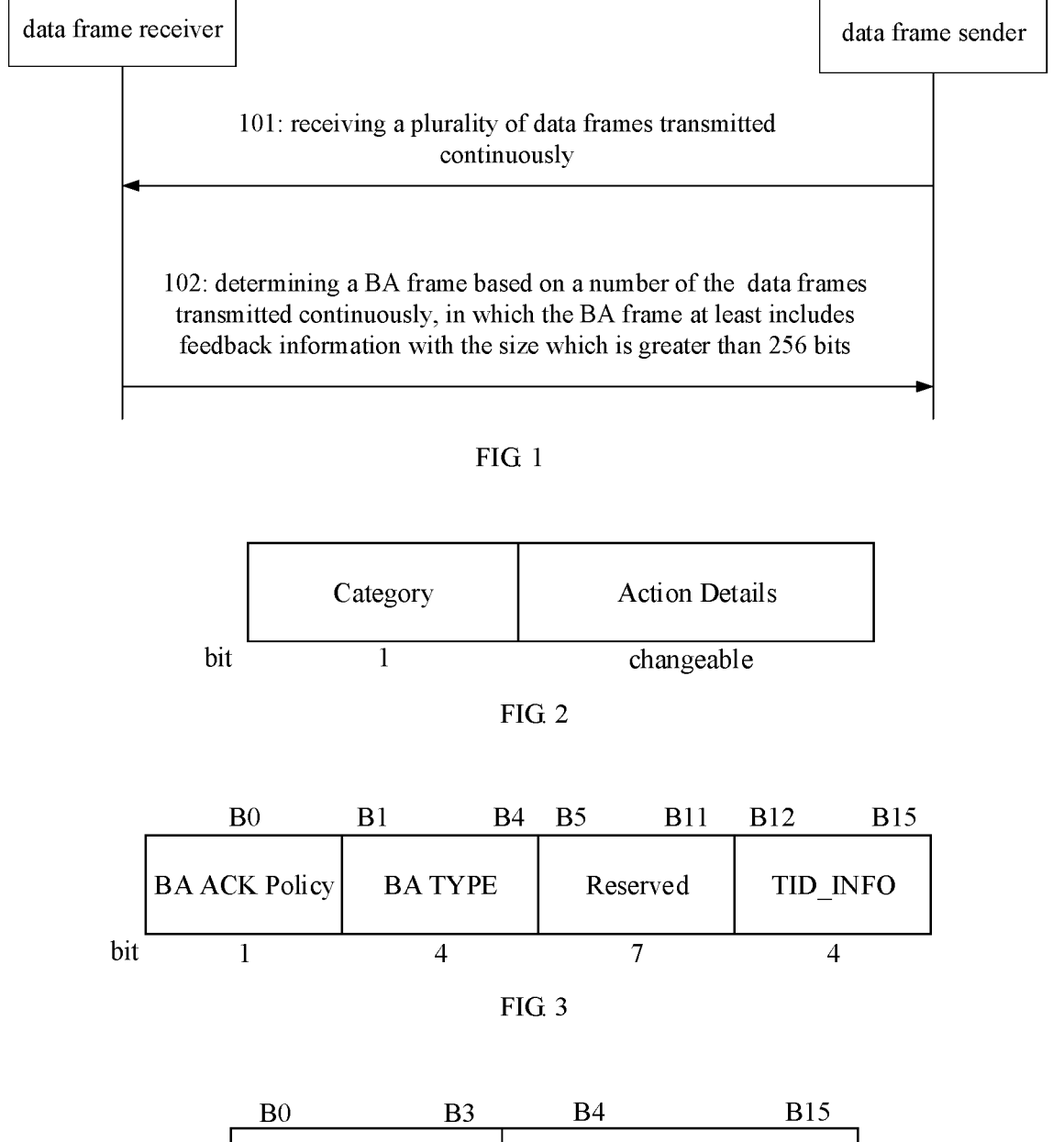

| data frame receiver | | data frame sender |

101: receiving a plurality of data frames transmitted continuously

102: determining a BA frame based on a number of the data frames transmitted continuously, in which the BA frame at least includes feedback information with the size which is greater than 256 bits

FIG. 1

| Category | Action Details |
|----------|----------------| bit          1                    changeable

FIG. 2

|   B0            B1          B4   B5        B11   B12       B15 |
| BA ACK Policy | BA TYPE | Reserved | TID_INFO | bit          1               4              7              4

FIG. 3

|   B0            B3   B4                   B15 |
| Fragment Number (01) | starting Sequence Number | bit              4                      12

FIG. 4

INFORMATION TRANSMISSION METHOD AND APPARATUS, COMMUNICATION DEVICE AND STORAGE MEDIUM

CROSS-REFERENCE TO RELATED APPLICATIONS

This application is a national phase application of International Application No. PCT/CN2020/100716, filed Jul. 7, 2020, the entire contents of which are incorporated herein by reference.

TECHNICAL FIELD

The present disclosure relates to but not limited to a field of wireless communication technologies, and particularly to a method ad an apparatus for information transmission, a communication device and a storage medium.

BACKGROUND

The Institute of Electrical and Electronics Engineers has established a study group (SG) to study a mainstream next generation Wi-Fi technology. The scope of the study includes: Wi-Fi transmission with 320 MHz bandwidth, an aggregation and collaboration technology using a plurality of frequency bands, etc., which increases the rate and throughput by at least four times relative to the existing IEEE 802.11Ax. The new technology is mainly applied to video transmission, augmented reality (AR), virtual reality (VR), etc. The aggregation and collaboration technology using a plurality of frequency bands refers to communications between Wi-Fi devices in different frequency bands such as 2.4 GHz, 5.8 GHz and 6-7 GHz, or in different bandwidths in the same frequency band. Transmission using a plurality of frequency bands is also referred to as multi-connection transmission.

In Wi-Fi communication, a data frame receiver may feed back a receiving status of a plurality of data frames to a data frame sender using a block ACK (BA) method.

SUMMARY

According to a first aspect of embodiments of the present disclosure, a method for information transmission is provided, and applied to a data frame receiver. The method includes:

receiving a plurality of data frames transmitted continuously; and determining a block ACK message (BA) frame based on a number of the data frames transmitted continuously, in which, the BA frame at least includes feedback information with the size which is greater than 256 bits.

According to a second aspect of embodiments of the present disclosure, a method for information transmission is provided, and applied to a data frame sender. The method includes:

receiving a BA frame, in which, the BA frame is determined by a data frame receiver based on a number of data frames transmitted continuously, in which, the BA frame at least includes feedback information with the size which is greater than 256 bits.

According to a third aspect of embodiments of the present disclosure, a communication device is provided, and includes a processor, and a memory storing an executable program executable by the processor. The processor is configured to perform the method for information transmission as described in the first aspect or the second aspect.

According to a fourth aspect of embodiments of the present disclosure, a storage medium storing an executable program is provided. When the executable program is executed by a processor, steps of the method for information transmission as described in the first aspect or the second aspect are implemented.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, illustrate embodiments in conformity with the present disclosure, and explain the principle of embodiments of the present disclosure together with the specification.

FIG. 1 is a flowchart illustrating a method for information transmission according to an exemplary embodiment;

FIG. 2 is a diagram illustrating a structure of a BA request frame field according to an exemplary embodiment;

FIG. 3 is a diagram illustrating a structure of a BA frame control field according to an exemplary embodiment;

FIG. 4 is a diagram illustrating a structure of a BA starting sequence sub-field according to an exemplary embodiment;

DETAILED DESCRIPTION

Figure 5:
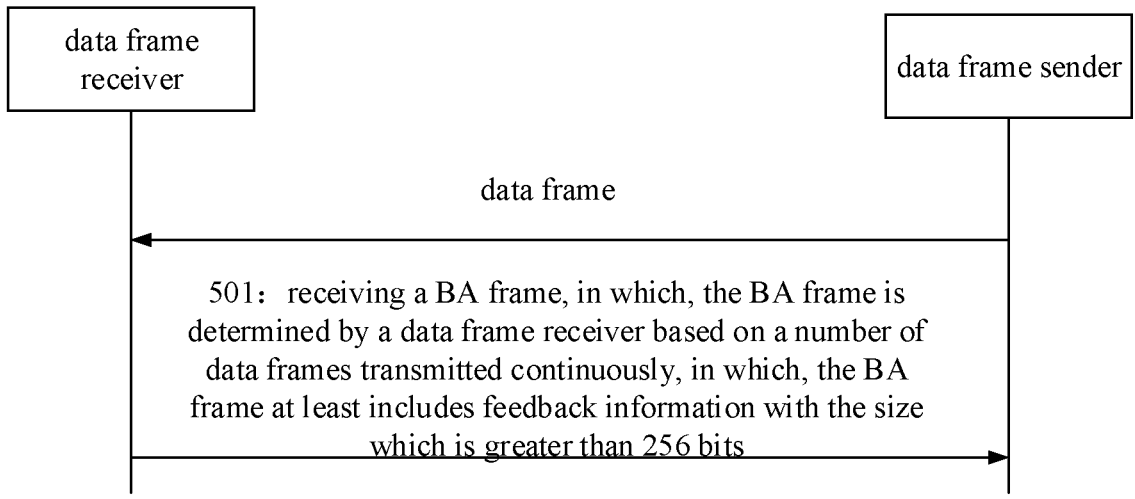
FIG. 5 is a flowchart illustrating another method for information transmission according to an exemplary embodiment.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a/an", "said" and "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "if" as used herein may be interpreted as "in a case that" or "when" or "in response to determining".

The executive body referred in embodiments of the present disclosure includes but is not limited to a wireless communication device especially a network device in an IEEE802.11a/b/g/n/ac standard or in an IEEE802.11be standard in a next generation Wi-Fi network. The network device includes but is not limited to a Wi-Fi router such as a wireless access point (AP) device, a wireless station (STA), a user equipment, a user node, a mobile terminal or a tablet computer.

An application scene of embodiments of the present disclosure is that a receiving status of each data frame is fed back using a bitmap in a BA. In the related art, a bitmap in the BA occupies maximum 256 bits. With application of the technology such as multi-connection transmission, a throughput of Wi-Fi communication data is increased. 256 bits may not satisfy the feedback requirement of the data frame. The bitmap requires more bits to feed back a receiving status of each data frame.

As illustrated in FIG. 1, a method for information transmission is provided in the exemplary embodiment. The method for information transmission may be applied to a first communication terminal for wireless communication, and includes the following steps.

At block 101, a plurality of data frames transmitted continuously are received.

At block 102, a block ACK message (BA) frame is determined based on a number of the data frames transmitted continuously. The BA frame at least includes feedback information with the size which is greater than 256 bits.

The data frame receiver may be an access point (AP) or a station (STA) in a Wi-Fi communication system.

The data frame receiver may feed back a receiving status of the data frames to the data frame sender via the BA frame when receiving the data frames sent by the data frame sender. The data frame receiver may feed back a receiving status of a plurality of data frames via one BA frame. The data frame may be a plurality of data frames sent via a single connection, or may be a plurality of data frames sent via a plurality of connections. The data frames may be unicast data frames, or may be continuous data frames, or may be data sub-frames in a continuous data frame.

The BA frame may carry feedback information for indicating a receiving status of each data frame. For example, in feedback information, "0" may indicate that the data frame is successfully received, and "1" may indicate that the data frame fails to be received; or "1" may indicate that the data frame is successfully received, and "0" may indicate that the data frame fails to be received.

The maximum value of the bit number of the feedback information included in the BA frame in the related technical standard is limited. For example, the maximum value of the bit number of the feedback information in the BA frame in the IEEE802.11ax standard is 256 bits.

The BA frame may adopt feedback information with the size of 32, 64, 128 or 256 bits, or feedback information with the size which is greater than 256 bits. For example, if the size is greater than 256 bits, M times of 256 may be taken as a bit number of feedback information, in which, M may be a positive integer. For example, feedback information with the size of 512 bits or feedback information with the size of 1024 bits, etc. may be adopted. A larger bit number may accommodate more feedback information. For example, a feedback of a receiving status of more data frames may be provided, and/or transmission connection information, TID information and/or STA information of data frames failing to be received may be provided.

Whether to adopt feedback information with the size which is greater than 256 bits may be determined based on a number of received data frames. A receiving status of one data frame may be indicated by one bit in the feedback information.

When the number of data frames is less than or equal to 256, feedback information with the size which is less than or equal to 256 bits may be adopted. For example, when the number of data frames is 128, feedback information with the size of 128 bits may be adopted; when the number of data frames is greater than 256, feedback information with the size which is greater than 256 bits may be adopted.

The data frame sender may determine a receiving status of more data frames based on feedback information when receiving the BA frame including the feedback information with the size which is greater than 256 bits, and may perform retransmission based on the feedback information, which improves a retransmission efficiency. The data frame sender may determine transmission connection and/or TID of the data frame failing to be received based on the feedback information, and perform retransmission for different transmission connections and/or TIDs.

More feedback information may be provided for the data frame sender by transmitting the BA frame including the feedback information with the size which is greater than 256 bits. For example, receiving status information of more data frames may be provided. On one hand, the BA frame may provide more feedback information, reduce the number of BA frames sent by the data frame receiver, and reduce the signaling overhead. On the other hand, the data frame sender obtains more feedback information and makes corresponding responses. For example, receiving status information of more data frames may be obtained, and more data frames may be retransmitted, thereby improving the communication efficiency.

In an embodiment, determining a block ACK message (BA) frame based on a number of the data frames transmitted continuously, includes: determining the BA frame at least including the feedback information with the size which is greater than 256 bits in response to receiving the BA request including first indication information.

The data frame sender may determine a form of receiving a feedback before sending data frames. For example, it may determine a number of data frames for feeding back a receiving status in one BA frame, etc., and then determine a BA frame for feeding back the receiving status of the data frames.

The data frame sender may send a BA request to the data frame receiver when determining a desired BA frame. The BA request carries first indication information for feeding back a receiving status indicating feedback information with the size which is greater than 256 bits.

For example, when the number of data frames needing to be sent by the data frame sender is greater than 256 and desires to obtain a receiving status of all data frames in one BA frame, the data frame sender may send a BA request including the first indication information, to indicate that the data frame receiver feeds back a receiving status using a BA frame including feedback information with the size which is greater than 256 bits.

By explicitly indicating a BA frame that the data frame sender desires to adopt, the probability of feeding back using the BA frame other than desired is reduced, and the situation of being unable to meet the transmission requirement of the data frame receiver is avoided, which improves the communication efficiency.

In an embodiment, a category field in the BA request carries the first indication information.

The BA request may adopt the same BA request format as the related art, that is, the BA request may adopt the same format of BA request frame. The first indication information may be carried in the category field.

For example, as illustrated in FIG. 2, a category field of a BA request frame in an IEEE802.11ax standard may carry the first indication information. In the BA request frame in the IEEE802.11ax standard, different codes of the category field represent different definitions. Codes with coded values of 21 to 125 are reserved codes. One may be selected from codes with coded values of 21 to 125 and determined as first indication information. For example, the code with a coded value of 25 may be selected as first indication information.

The data frame sender sends a BA request frame to the data frame receiver, and sets the coded value of the category field as 25. The data frame receiver may determine that the data frame sender requests a BA frame including feedback information with the size which is greater than 256 bits for receiving a feedback when receiving the BA request frame.

In an embodiment, the BA frame further includes: a category indication for indicating a category of the BA frame.

The data frame receiver may carry a category indication in the BA frame for indicating the frame category of the BA frame including feedback information with the size which is greater than 256 bits.

The data frame sender may determine that the received BA frame is a BA frame including feedback information with the size which is greater than 256 bits when receiving the BA frame.

The BA frame including feedback information with the size which is greater than 256 bits may be configured to indicate data frames in different scenarios, such as data frames in a plurality of connections, or data frames of a plurality of STAs. That is, the BA frame including feedback information with the size which is greater than 256 bits may be divided into a plurality of frame categories based on the data frame category fed back. For example, when the BA frame is configured to feed back data frames of a plurality of connections, the BA frame is a multi-connection BA frame, and when the BA frame is configured to feed back data frames of a plurality of STAs, the BA frame is a multi-STA BA frame.

The category indication may indicate that the BA frame is a BA frame including feedback information with the size which is greater than 256 bits. It also may indicate a detailed category of the BA frame, for example, a multi-connection BA frame, a multi-STA BA frame, etc. The multi-connection BA frame is configured to indicate receiving feedback information of data frames transmitted in a plurality of connections. The plurality of connections may be established by one or more data frame senders and data frame receivers. The plurality of connections are a plurality of connections established between one STA and an AP, that is, the plurality of connections belong to the same STA.

The multi-STA BA frame is configured to indicate receiving feedback information of the data frames transmitted by a plurality of data frame senders. The connection established between the data frame sender and the data frame receiver may be one or more.

In an embodiment, a BA control field of the BA frame carries the category indication.

The BA frame including feedback information with the size which is greater than 256 bits may adopt the same format of the BA control field of the BA frame as the related art. The BA control field carries a category indication.

For example, as illustrated in FIG. 3, a reserved code of a BA category field in the BA frame control field in the IEEE 802.11 ax standard may be configured to indicate a frame category of the BA frame including feedback information with the size which is greater than 256 bits.

The BA category field in the BA frame control field in the IEEE 802.11 ax standard occupies 4 bits. Codes with coded values of 7 to 9 and coded values of 12 to 15 are reserved codes. The frame category of the BA frame including the feedback information with the size which is greater than 256 bits may be indicated as a multi-connection BA frame using the coded value of 7, the frame category of the BA frame including the feedback information with the size which is greater than 256 bits may be indicated as a multi-STA BA frame using the coded value of 8, and the frame category of the BA frame including the feedback information with the size which is greater than 256 bits may be indicated as a multi-TID BA frame using the coded value of 9.

In an embodiment, the BA frame indicated by the category indication is one of:

a multi-connection BA frame;

a multi-STA BA frame; or a multi-traffic identifier (TID) BA frame.

The feedback information carried in the multi-connection BA frame is configured to indicate a receiving status of data frames sent by a plurality of connections.

The feedback information carried in the multi-STA BA frame is configured to indicate a receiving status of data frames sent by a plurality of STAs.

The feedback information carried in the TID BA frame is configured to indicate a receiving status of data frames sent by a plurality of data frame senders identified by the TID.

The BA frame including feedback information with the size which is greater than 256 bits may be configured to indicate data frames in different scenarios, such as data frames in a plurality of connections, or data frames of a plurality of STAs, or data frames sent by a plurality of data frame senders identified by a plurality of TIDs. Different BA frames may be configured to feed back data frames in different scenarios, that is, the BA frames may be divided into a plurality of frame categories based on the category of data frames fed back. For example, when the BA frame is configured to feed back data frames of a plurality of connections, the BA frame is a multi-connection BA frame, and when the BA frame is configured to feed back data frames of a plurality of STAs, the BA frame is a multi-STA BA frame, and when the BA frame is configured to feed back data frames of a plurality of data frames identified by a plurality of TIDs, the BA frame is a multi-TID BA frame. Services of data frames identified by different TIDs are different.

The feedback information in the multi-connection BA frame may be configured to indicate a receiving status of data frames sent by a plurality of connections. The feedback information in the multi-STA BA frame may be configured to indicate a receiving status of data frames sent by a plurality of STAs. The feedback information in the multi- TID BA frame may be configured to indicate a receiving status of data frames sent by a plurality of data frame senders identified by the TIDs.

In an embodiment, the BA frame further includes a bit number indication for indicating a bit number of feedback information included in the BA frame.

The data frame receiver may respectively carry a bit number indication for indicating a bit number of feedback information in the BA frame when sending the BA frame.

For example, the bit number indication may indicate a bit number using different coded values, for example, "1001" is used to indicate that the bit number of the feedback information is 512.

The bit number of the feedback information in the BA frame explicitly indicated may be configured to verify parsed bit number of feedback information, thereby improving the accuracy of parsing the feedback information.

In an embodiment, a fragment number field of a BA starting sequence sub-field of the BA frame carries the bit number indication.

The BA frame including feedback information with the size which is greater than 256 bits may adopt the same BA starting sequence sub-field as the related art. Different codes using the same bit may be adopted to carry a bit number indication. For example, different codes in a fragment number field may be adopted to indicate the bit number of the feedback information.

For example, as illustrated in FIG. 4, a reserved code in a fragment number field of a BA starting sequence sub-field of the BA frame may be adopted to carry a bit number indication. The fragment number field occupies four bits, and reserved codes may be adopted to indicate the bit number of feedback information included in the BA frame including feedback information with the size which is greater than 256 bits. For example, "1001" may be used to indicate that the bit number of the feedback information is 512, and "1010" may be used to indicate that the bit number of the feedback information is 1024.

In an embodiment, the feedback information is a bitmap indicating a receiving status of the data frames. The bitmap is located in a BA information field of the BA frame.

The feedback information carried in the BA frame may indicate a receiving status of each data frame in a form of a bitmap. One bit in the bitmap corresponds to one data frame, that is, each bit in the bitmap indicates a receiving status of one data frame. For example, in the bitmap, "0" may indicate that the data frame is successfully received, and "1" may indicate that the data frame fails to be received; or "1" may indicate that the data frame is successfully received, and "0" may indicate that the data frame fails to be received.

The bit number of the bitmap in the BA frame may be M times a bit number of the BA frame bitmap in the related art, in which, M may be a positive integer. The bit number of the bitmap in the BA frame may be 512 or 1024.

As illustrated in FIG. 5, a method for information transmission is provided in the exemplary embodiment. The method for information transmission is applicable to a data frame sender for wireless communication. The method includes the following steps.

At block 501, a BA frame is received. The BA frame is determined by a data frame receiver based on a number of data frames transmitted continuously. The BA frame at least includes feedback information with the size which is greater than 256 bits.

The data frame receiver may be an access point (AP) or a station (STA) in a Wi-Fi communication system.

The data frame receiver may feed back a receiving status of the data frames to the data frame sender by the BA frame when receiving the data frames sent by the data frame sender. The data frame receiver may feed back a receiving status of a plurality of data frames via one BA frame. The data frame may be a plurality of data frames sent via a single connection, or may be a plurality of data frames sent via a plurality of connections. The data frames may be unicast data frames, or may be continuous data frames, or may be data sub-frames in a continuous data frame.

The BA frame may carry feedback information for indicating a receiving status of each data frame. For example, in feedback information, "0" may indicate that the data frame is successfully received, and "1" may indicate that the data frame fails to be received; or "1" may indicate that the data frame is successfully received, and "0" may indicate that the data frame fails to be received.

The maximum value of the bit number of the feedback information included in the BA frame in the related technical standard is limited. For example, the maximum value of the bit number of the feedback information in the BA frame in the IEEE802.11ax standard is 256 bits.

The BA frame may adopt feedback information with the size of 32, 64, 128 or 256 bits, or feedback information with the size which is greater than 256 bits. For example, if the size is greater than 256 bits, M times of 256 may be taken as a bit number of feedback information, in which, M may be a positive integer. For example, feedback information with the size of 512 bits or feedback information with the size of 1024 bits, etc. may be adopted. A larger bit number may accommodate more feedback information. For example, a feedback of a receiving status of more data frames may be provided, and/or transmission connection information, TID information and/or STA information of data frames failing to be received may be provided.

Whether to adopt feedback information with the size which is greater than 256 bits may be determined based on a number of received data frames. A receiving status of one data frame may be indicated by one bit in the feedback information.

When the number of data frames is less than or equal to 256, feedback information with the size which is less than or equal to 256 bits may be adopted. For example, when the number of data frames is 128, feedback information with the size of 128 bits may be adopted; when the number of data frames is greater than 256, feedback information with the size which is greater than 256 bits may be adopted.

The data frame sender may determine a receiving status of more data frames based on feedback information when receiving the BA frame including the feedback information with the size which is greater than 256 bits, and may perform retransmission based on the feedback information, which improves the retransmission efficiency. The data frame sender may determine transmission connection and/or TID of the data frame failing to be received based on the feedback information, and perform retransmission for different transmission connections and/or TIDs.

More feedback information may be provided for the data frame sender by transmitting the BA frame including the feedback information with the size which is greater than 256 bits, for example, receiving status information of more data frames may be provided. On one hand, the BA frame may provide more feedback information, reduce the number of BA frames sent by the data frame receiver, and reduce the signaling overhead. On the other hand, the data frame sender obtains more feedback information and makes a corresponding response. For example, receiving status information of more data frames may be obtained, and more data frames may be retransmitted, thereby improving the communication efficiency.

In an embodiment, the method further includes: sending a BA request including first indication information in response to a number of the data frames transmitted being greater than or equal to a number threshold.

Receiving the BA frame, includes: receiving the BA frame at least including the feedback information with the size which is greater than 256 bits sent by the data frame receiver in response to receiving the BA request including the first indication information.

The data frame sender may determine a form of receiving a feedback before sending data frames. For example, it may determine a number of data frames feeding back a receiving status in one BA frame, etc., and then determine a BA frame for feeding back the receiving status of the data frames.

The data frame sender may send a BA request to the data frame receiver when determining a desired BA frame. The BA request carries first indication information for feeding back a receiving status indicating feedback information with the size which is greater than 256 bits.

For example, when the number of data frames needing to be sent by the data frame sender is greater than 256 and desires to obtain a receiving status of all data frames in one BA frame, the data frame sender may send a BA request including the first indication information, to indicate that the data frame receiver feeds back a receiving status using a BA frame including the feedback information with the size which is greater than 256 bits.

By explicitly indicating a BA frame that the data frame sender desires to adopt, the probability of feeding back using the BA frame other than desired is reduced, and the situation of being unable to meet the transmission requirement of the data frame receiver is avoided, which improves the communication efficiency.

In an embodiment, a category field in the BA request carries the first indication information.

The BA request may adopt the same BA request format as the related art, that is, the BA request may adopt the same format of BA request frame. The first indication information may be carried in the category field.

For example, as illustrated in FIG. 2, the category field in the BA request frame in the IEEE802.11ax standard may carry the first indication information. In the BA request frame in the IEEE802.11ax standard, different codes of the category field represent different definitions. Codes with coded values of 21 to 125 are reserved codes. One may be selected from the codes with coded values of 21 to 125 and determined as first indication information. For example, the code with a coded value of 25 may be selected as first indication information.

The data frame sender sends a BA request frame to the data frame receiver, and sets the coded value of the category field as 25. The data frame receiver may determine that the data frame sender requests a BA frame including feedback information with the size which is greater than 256 bits for receiving a feedback when receiving the BA request frame.

In an embodiment, a category indication carried in the BA frame is configured to indicate a category of the BA frame.

The data frame receiver may carry a category indication in the BA frame for indicating the frame category of the BA frame including feedback information with the size which is greater than 256 bits.

The data frame sender may determine that the received BA frame is a BA frame including feedback information with the size which is greater than 256 bits when receiving the BA frame.

The BA frame including feedback information with the size which is greater than 256 bits may be configured to indicate data frames in different scenarios, such as data frames in a plurality of connections, or data frames of a plurality of STAs. That is, the BA frame including feedback information with the size which is greater than 256 bits may be divided into a plurality of frame categories based on the data frame category fed back. For example, when the BA frame is configured to feed back data frames of a plurality of connections, the BA frame is a multi-connection BA frame, and when the BA frame is configured to feed back data frames of a plurality of STAs, the BA frame is a multi-STA BA frame.

The category indication may indicate that the BA frame is a BA frame including feedback information with the size which is greater than 256 bits. It may indicate a detailed category of the BA frame, for example, a multi-connection BA frame, a multi-STA BA frame, etc. The multi-connection BA frame is configured to indicate receiving feedback information of data frames transmitted in a plurality of connections. The plurality of connections may be established by one or more data frame senders and data frame receivers. The plurality of connections are a plurality of connections established between one STA and an AP, that is, the plurality of connections belong to the same STA.

The multi-STA BA frame is configured to indicate receiving feedback information of the data frames transmitted by the plurality of data frame senders. The connection established between the data frame sender and the data frame receiver may be one or more.

In an embodiment, a BA control field of the BA frame carries the category indication.

The BA frame including feedback information with the size which is greater than 256 bits may adopt the same format of the BA control field of the BA frame as the related art. The BA control field carries a category indication.

For example, as illustrated in FIG. 3, a reserved code of the BA category field in the BA frame control field in the IEEE 802.11 ax standard may be configured to indicate a frame category of the BA frame including feedback information with the size which is greater than 256 bits.

The BA category field in the BA frame control field in the IEEE 802.11 ax standard occupies 4 bits. Codes with coded values of 7 to 9 and coded values of 12 to 15 are reserved codes. The frame type of the BA frame including the feedback information with the size which is greater than 256 bits may be indicated as a multi-connection BA frame using the coded value of 7, the frame type of the BA frame including the feedback information with the size which is greater than 256 bits may be indicated as a multi-STA BA frame using the coded value of 8, and the frame type of the BA frame including the feedback information with the size which is greater than 256 bits may be indicated as a multi-TID BA frame using the coded value of 9.

In an embodiment, the BA frame indicated by the category indication is one of:

a multi-connection BA frame;

a multi-STA BA frame; or a multi-traffic identifier (TID) BA frame.

The feedback information carried in the multi-connection BA frame is configured to indicate a receiving status of data frames sent by a plurality of connections.

The feedback information carried in the multi-STA BA frame is configured to indicate a receiving status of data frames sent by a plurality of STAs.

The feedback information carried in the TID BA frame is configured to indicate a receiving status of data frames sent by a plurality of data frame senders identified by the TID.

The BA frame including feedback information with the size which is greater than 256 bits may be configured to indicate data frames in different scenarios, such as data frames in multi-connection, or data frames of a plurality of STAs, or data frames sent by a plurality of data frame senders identified by a plurality of TIDs. Different BA frames may be configured to feed back data frames in different scenarios, that is, the BA frames may be divided into a plurality of frame categories based on the category of data frames fed back. For example, when the BA frame is configured to feed back data frames of a plurality of connections, the BA frame is a multi-connection BA frame, and when the BA frame is configured to feed back data frames of a plurality of STAs, the BA frame is a multi-STA BA frame, and when the BA frame is configured to feed back data frames of a plurality of data frames identified by a plurality of TIDs, the BA frame is a multi-TID BA frame. Services of data frames identified by different TIDs are different.

The feedback information in the multi-connection BA frame may be configured to indicate a receiving status of data frames sent by a plurality of connections. The feedback information in the multi-STA BA frame may be configured to indicate a receiving status of data frames sent by a plurality of STAs. The feedback information in the multi-TID BA frame may be configured to indicate a receiving status of data frames sent by a plurality of data frame senders identified by the TIDs.

In an embodiment, the BA frame further includes a bit number indication for indicating a bit number of feedback information included in the BA frame.

The data frame receiver may respectively carry a bit number indication for indicating a bit number of feedback information in the BA frame when sending the BA frame.

For example, the bit number indication may indicate a bit number using different coded values, for example, "1001" is used to indicate that the bit number of the feedback information is 512.

The bit number of the feedback information in the BA frame explicitly indicated may be configured to verify parsed bit number of feedback information, thereby improving the accuracy of parsing the feedback information.

In an embodiment, a fragment number field of a BA starting sequence sub-field of the BA frame carries the bit number indication.

The BA frame including feedback information with the size which is greater than 256 bits may adopt the same BA starting sequence sub-field as the related art. Different codes using the same bit may be adopted to carry a bit number indication. For example, different codes in a fragment number field may be adopted to indicate the bit number of the feedback information.

For example, as illustrated in FIG. 4, a reserved code in a fragment number field of a BA starting sequence sub-field of the BA frame may be adopted to carry a bit number indication. The fragment number field occupies four bits, and reserved codes may be adopted to indicate the bit number of feedback information included in the BA frame including feedback information with the size which is greater than 256 bits. For example, "1001" may be used to indicate that the bit number of the feedback information is 512, and "1010" may be used to indicate that the bit number of the feedback information is 1024.

In an embodiment, the feedback information is a bitmap indicating a receiving status of the data frames. The bitmap is located in a BA information field of the BA frame.

The feedback information carried in the BA frame may indicate a receiving status of each data frame in a form of a bitmap. Each bit in the bitmap corresponding to one data frame, that is, each bit in the bitmap indicates a receiving status of one data frame. For example, in the bitmap, "0" may indicate that the data frame is successfully received, and "1" may indicate that the data frame fails to be received; or "1" may indicate that the data frame is successfully received, and "0" may indicate that the data frame fails to be received.

The bit number of the bitmap in the BA frame may be M times a bit number of the BA frame bitmap in the related art, in which, M may be a positive integer. For example, the bit number of the bitmap in the BA frame may be 512 or 1024, etc.

A specific example is provided in combination with the above any embodiment.

A new BA frame format is defined so that it is applicable to a length of a bitmap of 1024 bits or 512 bits.

1. As illustrated in FIG. 3, a new BA frame format is identified by a reserved bit of a BA type, specifically as follows. A BA type format is defined. For example, when the value of the BA type is 7, it is identified as a multi-connection BA frame in 802.11be, and when the value of the BA type is set 8, it is identified as a multi-STA BA frame, and when the value of the BA type is set 9, it is identified as a multi-TID BA frame.

2. Identifier of Bitmap Length

As illustrated in FIG. 4, a bitmap length is identified by a fragment number in the existing standard, for example, by B00-B3 reserved bits.

3. Establishment of Multi-connection BA

A new mechanism for a new BA request and a BA response is defined.

As illustrated in FIG. 3, a category field reserved bit identifier is adopted to establish a multi-connection BA frame feedback mechanism.

Figure 6:
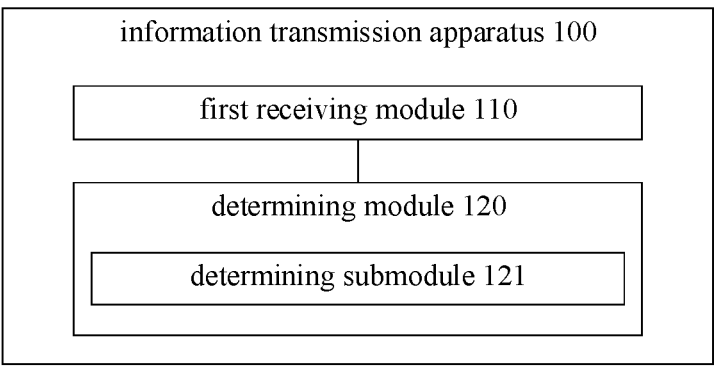
FIG. 6 is a block diagram illustrating an apparatus for information transmission according to an exemplary embodiment.
Figure 7:
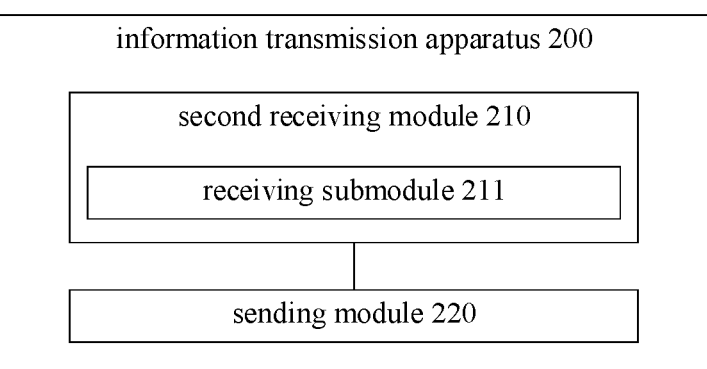
FIG. 7 is a block diagram illustrating another apparatus for information transmission according to an exemplary embodiment.

An apparatus for information transmission is provided in embodiments of the present disclosure, and applied to a data frame receiver for wireless communication. As illustrated in FIG. 6, the apparatus 100 for information transmission includes a first receiving module 110 and a determining module 120.

The first receiving module 110 is configured to receive a plurality of data frames transmitted continuously.

The determining module 120 is configured to determine a block ACK message (BA) frame based on a number of the data frames transmitted continuously. The BA frame at least includes feedback information with the size which is greater than 256 bits.

In an embodiment, the determining module 120 includes a determining submodule 121.

The determining submodule 121 is configured to determine the BA frame at least including the feedback information with the size which is greater than 256 bits in response to receiving a BA request including first indication information.

In an embodiment, a category field in the BA request carries the first indication information.

In an embodiment, the BA frame further includes: a category indication for indicating a category of the BA frame.

In an embodiment, a BA control field of the BA frame carries the category indication.

In an embodiment, the BA frame indicated by the category indication is one of:

a multi-connection BA frame;

a multi-STA BA frame; or a multi-traffic identifier (TID) BA frame.

In an embodiment, the BA frame further includes a bit number indication for indicating a bit number of feedback information included in the BA frame.

In an embodiment, a fragment number field of a BA starting sequence sub-field of the BA frame carries the bit number indication.

In an embodiment, the feedback information is a bitmap indicating a receiving status of the data frames. The bitmap is located in a BA information field of the BA frame.

An apparatus for information transmission is provided in embodiments of the present disclosure, and applied to a data frame receiver for wireless communication. The apparatus 200 for information transmission includes a second receiving module 210.

The second receiving module 210 is configured to receive a BA frame. The BA frame is determined by the data frame receiver based on a number of data frames transmitted continuously. The BA frame at least includes feedback information with the size which is greater than 256 bits.

In an embodiment, the apparatus 200 further includes a sending module 220.

The sending module 220 is configured to send a BA request including first indication information in response to a number of the data frames transmitted being greater than or equal to a number threshold.

The second receiving module 210 includes a receiving submodule 211.

The receiving submodule 211 is configured to receive the BA frame at least including the feedback information with the size which is greater than 256 bits sent by the data frame receiver in response to receiving the BA request including the first indication information.

In an embodiment, a category field in the BA request carries the first indication information.

In an embodiment, a category indication carried in the BA frame is configured to indicate a category of the BA frame.

In an embodiment, a BA control field of the BA frame carries the category indication.

In an embodiment, the BA frame indicated by the category indication is one of:

a multi-connection BA frame;

a multi-STA BA frame; or a multi-traffic identifier (TID) BA frame.

In an embodiment, the BA frame further includes a bit number indication for indicating a bit number of feedback information included in the BA frame.

In an embodiment, a fragment number field of a BA starting sequence sub-field of the BA frame carries the bit number indication.

In an embodiment, the feedback information is a bitmap indicating a receiving status of the data frames. The bitmap is located in a BA information field of the BA frame.

In an exemplary embodiment, the first receiving module 110, the determining module 120, the second receiving module 210 and the sending module 220, etc. may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), universal processors, controllers, micro controller units (MCUs), microprocessors or other electronic components, to perform the above method.

Figure 8:
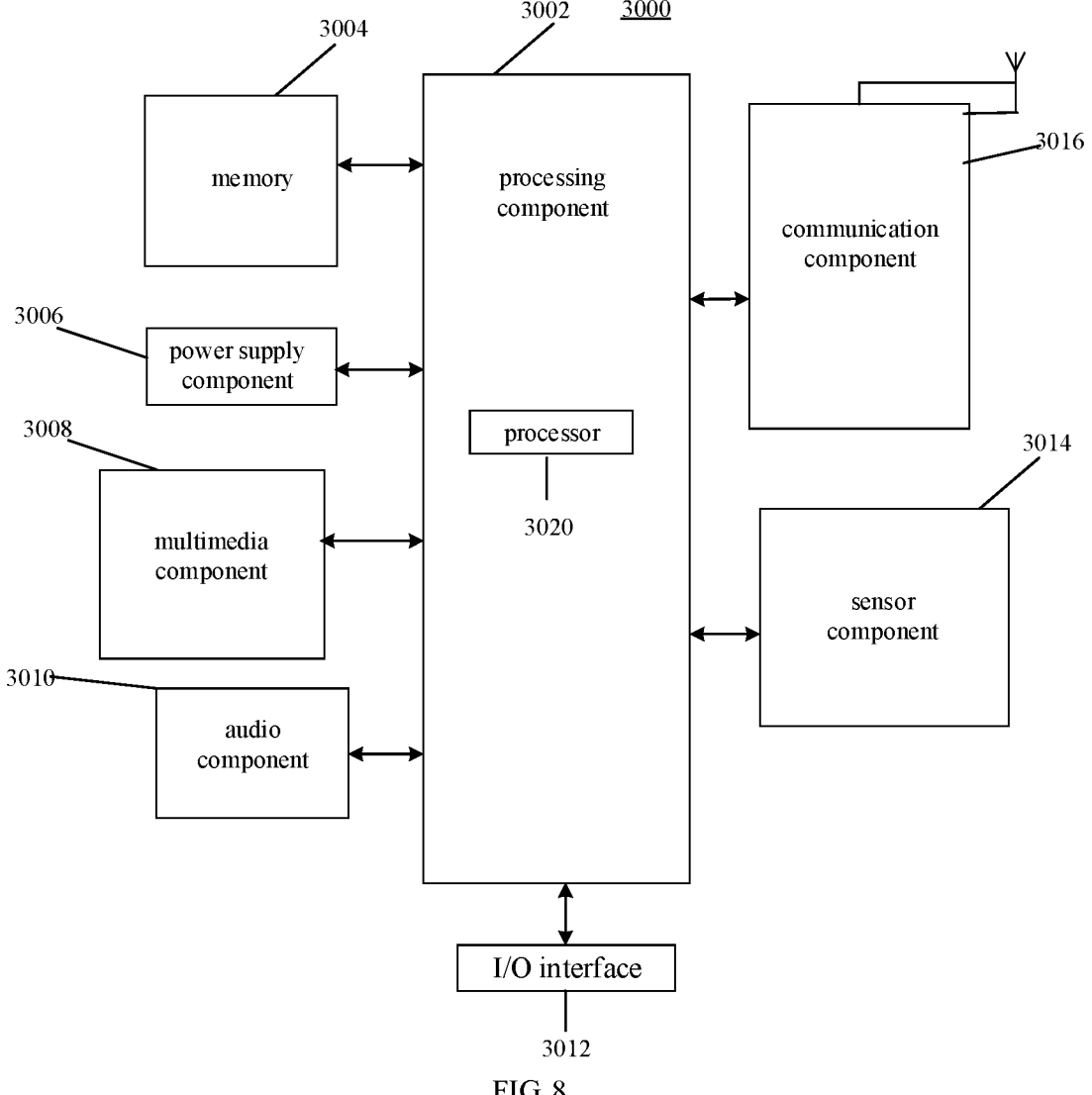
FIG. 8 is a block diagram illustrating a device for information transmission according to an exemplary embodiment.

FIG. 8 is a block diagram illustrating a device 3000 for information transmission according to an exemplary embodiment. For example, the device 3000 may be a mobile phone, a computer, a digital broadcasting terminal, a messaging device, a game console, a tablet device, a medical equipment, a fitness equipment, a personal digital assistant, etc.

As illustrated FIG. 8, the device 3000 may include one or more components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of blocks of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the device 3000. Examples of the data include the instructions of any applications or methods operated on the device 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 may provide power supply for all components of the device 3000. The power supply component 3006 may include power supply management system, one or more power supplies, and other units related to generating, managing and distributing power for the device 3000.

The multimedia component 3008 includes an output interface screen provided between the device 3000 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touching or sliding operation. In some embodiments, the multimedia component 3008 includes a front camera and/or a rear camera. When the terminal 3000 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 3010 is configured as an output and/or input signal. For example, the audio component 3010 includes a microphone (MIC). When the device 3000 is in operation mode, such as call mode, record mode, and speech recognition mode, the microphone is configured to receive the external audio signals. The audio signals received may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the device 3000. For example, the sensor component 3014 may detect the on/off state of the device 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor, which is configured to detect the existence of the objects nearby without any physical contact. The sensor component 3014 may further include a light sensor such as CMOS or CCD image sensor, which is configured to use in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The device 3000 may access wireless networks based on communication standard, such as WiFi, 2G or 3G or their combination. In an exemplary embodiment, the communication component 3016 receives broadcast signals or broadcast-related information from an external broadcast management system via a broadcast channel. In an exemplary embodiment, the communication component 3016 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an exemplary embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer readable storage medium is further provided which includes instructions, such as the memory 3004 including instructions, wherein the instructions may be executed by the processor 3020 of the device 3000 to complete the above methods. For example, the non-transitory computer readable storage medium may be a ROM, a random access memory (RAM), a CD-ROM, a magnetic tape, a floppy disk, an optical data storage device, etc.

The method and the apparatus for information transmission, the communication device, and the storage medium provided in embodiments of the present disclosure, include: a data frame receiver receives data frames transmitted continuously; and determines a block ACK message (BA) frame based on a number of the data frames transmitted continuously, in which, the BA frame at least includes feedback information with the size which is greater than 256 bits. More feedback information may be provided for a data frame sender by transmitting the BA frame including the feedback information with the size which is greater than 256 bits. For example, receiving status information of more data frames may be provided. On one hand, the BA frame may provide more feedback information, reduce the number of BA frames sent by the data frame receiver, and reduce a signaling overhead. On the other hand, the data frame sender obtains more feedback information and makes corresponding responses. For example, receiving status information of more data frames may be obtained, and more data frames may be retransmitted, thereby improving the communication efficiency.

After considering the specification and practicing the disclosure herein, those skilled in the art will easily think embodiment of other implementations. The present application is intended to cover any variations, usages, or adaptive changes of the present disclosure. These variations, usages, embodiment or adaptive changes follow the general principles of the present disclosure and include common knowledge or conventional technical means in the technical field embodiment not disclosed by the present disclosure. The description and the embodiments are to be regarded as exemplary only, and embodiment the true scope and spirit of the present disclosure are given by the appended claims.

It should be understood that the present invention is not limited to the precise structure described above and shown in the drawings, and various modifications and changes may be made without departing from its scope. The scope of embodiments of the present disclosure is only limited by the appended claims.

What is claimed is:

1. A method for information transmission, applied to a station (STA), the method comprising:

receiving a plurality of data frames transmitted continuously from an access point (AP), wherein the data frames are a plurality of data frames sent via a single connection or a plurality of data frames sent via a plurality of connections; and determining a block ACK message (BA) frame based on a number of the data frames transmitted continuously, wherein the BA frame at least comprises feedback information with a size greater than 256 bits, wherein the feedback information is a bitmap indicating a receiving status of the data frames and one bit in the bitmap corresponds to one data frame, and the BA frame further comprises at least one of transmission connection information, traffic identifier (TID) information or STA information of data frames failing to be received, wherein determining the BA frame based on the number of the data frames transmitted continuously, comprises:

determining the BA frame at least comprising the feedback information with the size greater than 256 bits according to a received BA request from the AP, wherein the BA request comprises first indication information indicating the feedback information with the size greater than 256 bits.

2. The method according to claim 1, wherein a category field in the BA request carries the first indication information.

3. The method according to claim 1, wherein the BA frame further comprises: a category indication for indicating a category of the BA frame, wherein a BA control field of the BA frame carries the category indication.

4. The method according to claim 3, wherein the BA frame indicated by the category indication is one of:

a multi-connection BA frame;

a multi-STA BA frame; or a multi-traffic identifier (TID) BA frame.

5. The method according to claim 3, wherein a reserved code of a BA type field in the BA control field of the BA frame in IEEE 802.11ax standard carries the category indication.

6. The method according to claim 1, wherein, the BA frame further comprises a bit number indication for indicating a bit number of feedback information comprised in the BA frame, and a fragment number field of a BA starting sequence subfield of the BA frame carries the bit number indication.

7. The method according to claim 1, wherein the bitmap is located in a BA information field of the BA frame.

8. The method according to claim 1, wherein the plurality of data frames are sent via a single connection or a plurality of connections.

9. The method according to claim 1, wherein a category field in the BA request in IEEE802.11ax standard carries the first indication information.

10. A non-transitory computer-readable storage medium with an executable program stored thereon, wherein when the executable program is executed by a processor, the processor is caused to perform the method of claim 1.

11. A method for information transmission, applied to an access point (AP), the method comprising:

receiving a block ACK message (BA) frame, wherein the BA frame is determined by a station (STA) based on a number of a plurality of data frames transmitted continuously, wherein the data frames are a plurality of data frames sent via a single connection or a plurality of data frames sent via a plurality of connections, wherein the BA frame at least comprises feedback information with a size greater than 256 bits, wherein the feedback information is a bitmap indicating a receiving status of the data frames and one bit in the bitmap corresponds to one data frame, and the BA frame further comprises at least one of transmission connection information, traffic identifier (TID) information or STA information of data frames failing to be received, wherein the method further comprises:

sending a BA request comprising first indication information in response to the number of the data frames transmitted being greater than or equal to a number threshold, and wherein receiving the BA frame, comprises:

receiving the BA frame at least comprising the feedback information with the size greater than 256 bits sent by the STA according to the received BA request comprising the first indication information indicating the feedback information with the size greater than 256 bits.

12. The method according to claim 11, wherein a category field in the BA request carries the first indication information.

13. The method according to claim 11, wherein a category indication carried in the BA frame is configured to indicate a category of the BA frame, wherein a BA control field of the BA frame carries the category indication.

14. The method according to claim 13, wherein the BA frame indicated by the category indication is one of:

a multi-connection BA frame;

a multi-STA BA frame; or a multi-traffic identifier (TID) BA frame.

15. The method according to claim 11, wherein, the BA frame further comprises a bit number indication for indicating a bit number of feedback information comprised in the BA frame, and a fragment number field of a BA starting sequence subfield of the BA frame carries the bit number indication.

16. The method according to claim 11, wherein the bitmap is located in a BA information field of the BA frame.

17. The method according to claim 11, wherein the plurality of data frames are sent via a single connection or a plurality of connections.

18. A communication device, as an access point (AP), comprising:

a processor; and a memory storing an executable program executable by the processor, wherein the processor is configured to perform the method of claim 11.

19. A non-transitory computer-readable storage medium with an executable program stored thereon, wherein when the executable program is executed by a processor, the processor is caused to perform the method of claim 11.

20. A communication device, as a station (STA), comprising:

a processor; and a memory storing an executable program executable by the processor, wherein the processor is configured to:

receive a plurality of data frames transmitted continuously from an access point (AP), wherein the data frames are a plurality of data frames sent via a single connection or a plurality of data frames sent via a plurality of connections; and determine a block ACK message (BA) frame based on a number of the data frames transmitted continuously, wherein the BA frame at least comprises feedback information with a size greater than 256 bits, wherein the feedback information is a bitmap indicating a receiving status of the data frames and one bit in the bitmap corresponds to one data frame, and the BA frame further comprises at least one of transmission connection information, traffic identifier (TID) information or STA information of data frames failing to be received, and wherein the processor is configured to:

determine the BA frame at least comprising the feedback information with the size greater than 256 bits according to a received BA request from the AP, wherein the BA request comprises first indication information indicating the feedback information with the size greater than 256 bits.

* * * * *